United States Patent
Xie et al.

(10) Patent No.: US 10,514,798 B2
(45) Date of Patent: Dec. 24, 2019

(54) TOUCH PANEL WITH FINGERPRINT IDENTIFICATION FUNCTION AND METHOD FOR FABRICATING THE SAME

(71) Applicant: TPK Touch Solutions (Xiamen) Inc., Xiamen (CN)

(72) Inventors: Yanjun Xie, Wuhan (CN); Yau-Chen Jiang, Zhubei (TW); Bin Lai, Fuzhou (CN); Lizhen Zhuang, Zhangzhou (CN); Yuh-Wen Lee, Zhubei (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 171 days.

(21) Appl. No.: 15/201,509

(22) Filed: Jul. 4, 2016

(65) Prior Publication Data

US 2017/0004343 A1   Jan. 5, 2017

(30) Foreign Application Priority Data

Jul. 3, 2015   (CN) .......................... 2015 1 0382111

(51) Int. Cl.
*G06F 3/041* (2006.01)
*G06K 9/00* (2006.01)

(52) U.S. Cl.
CPC ......... *G06F 3/0416* (2013.01); *G06K 9/0002* (2013.01)

(58) Field of Classification Search
None
See application file for complete search history.

(56) References Cited

U.S. PATENT DOCUMENTS

| | | | | |
|---|---|---|---|---|
| 2011/0309482 | A1* | 12/2011 | Salatino ............. | G06K 9/00053 257/659 |
| 2012/0092350 | A1* | 4/2012 | Ganapathi .......... | G02B 26/0833 345/501 |
| 2012/0242635 | A1* | 9/2012 | Erhart .................. | G06F 1/1626 345/207 |
| 2013/0307818 | A1* | 11/2013 | Pope ...................... | G06F 3/044 345/174 |
| 2014/0103943 | A1* | 4/2014 | Dunlap ................ | G01N 27/221 324/663 |
| 2015/0187707 | A1* | 7/2015 | Lee ....................... | H01L 23/562 324/663 |

* cited by examiner

*Primary Examiner* — Stephen T. Reed
(74) *Attorney, Agent, or Firm* — Cooper Legal Group, LLC

(57) ABSTRACT

A touch panel with a fingerprint identification function includes a cover plate, a mask layer, a flexible substrate, and a fingerprint sensing array. The mask layer is disposed on the cover plate for defining an operating region and a non-operating region of the touch panel. The flexible substrate is disposed on the mask layer and at least in the non-operating region. The fingerprint sensing array is directly disposed on the flexible substrate in the non-operating region. Through the configuration that the fingerprint sensing array is disposed on the flexible substrate, the distance between the fingerprint sensing array and a user's fingers is reduced, thereby increasing the sensitivity of fingerprint identification.

20 Claims, 7 Drawing Sheets

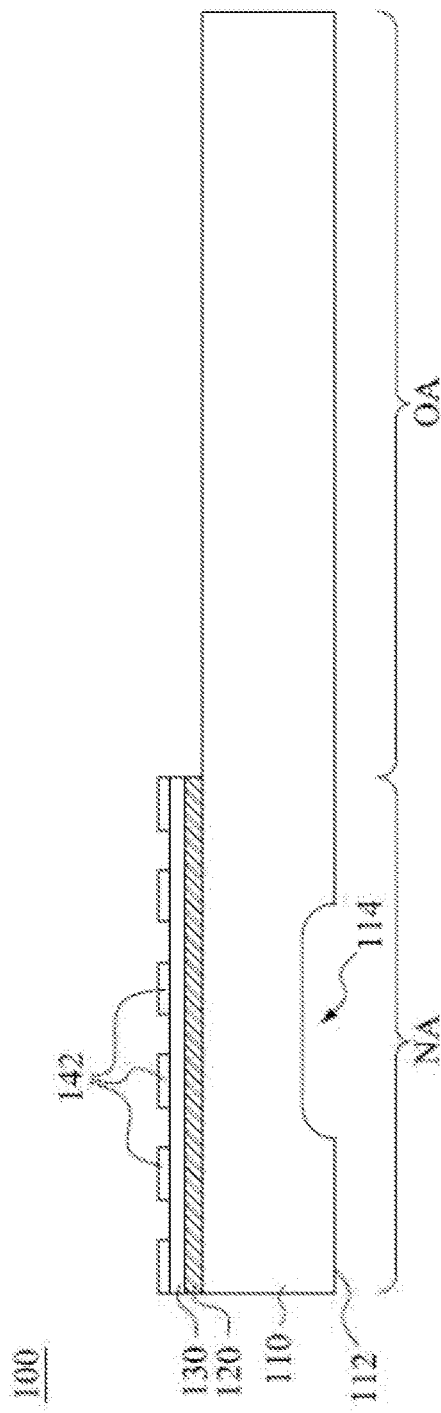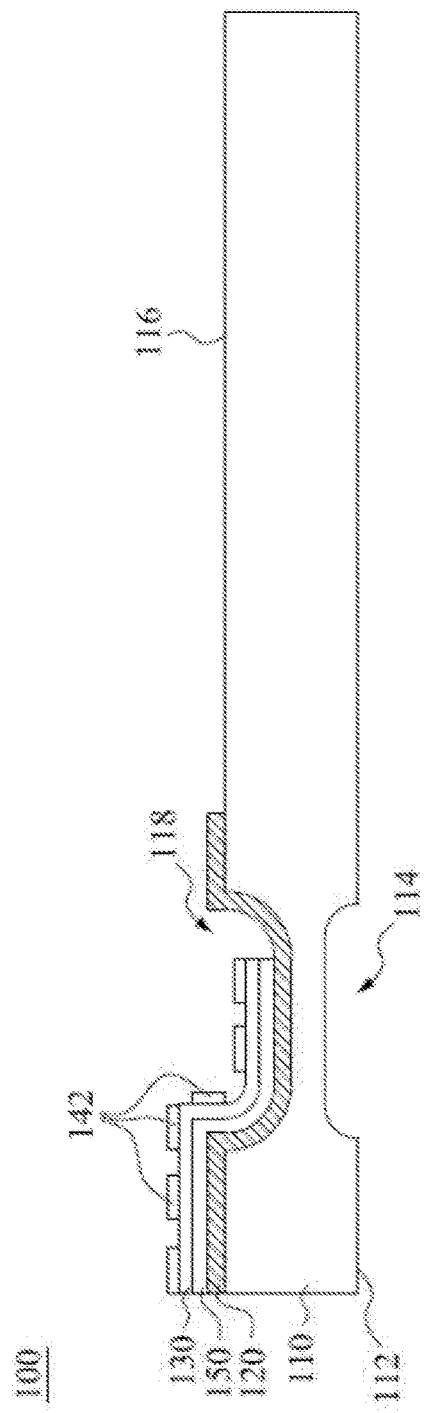

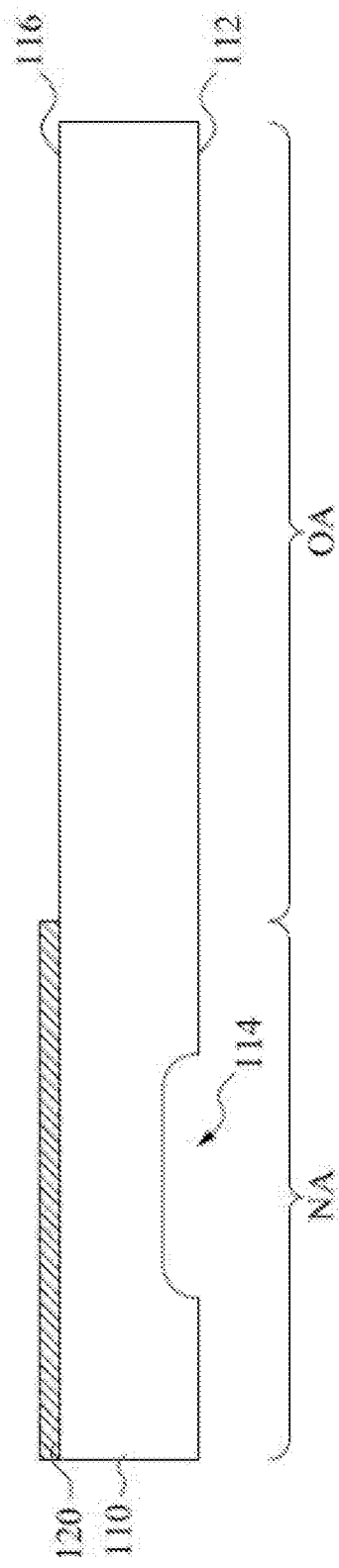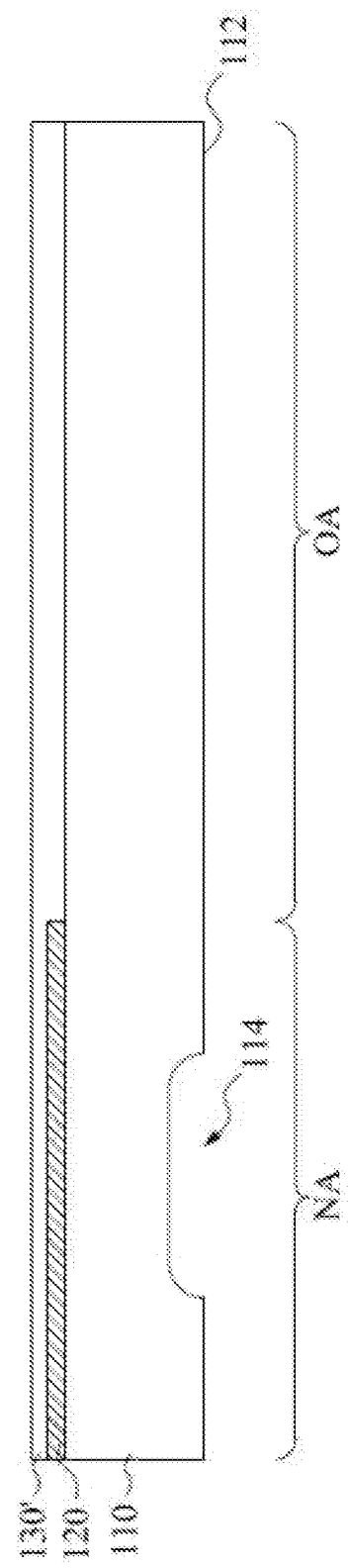

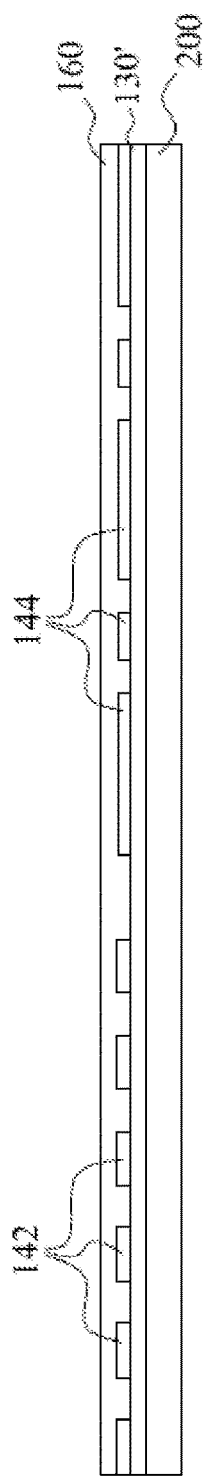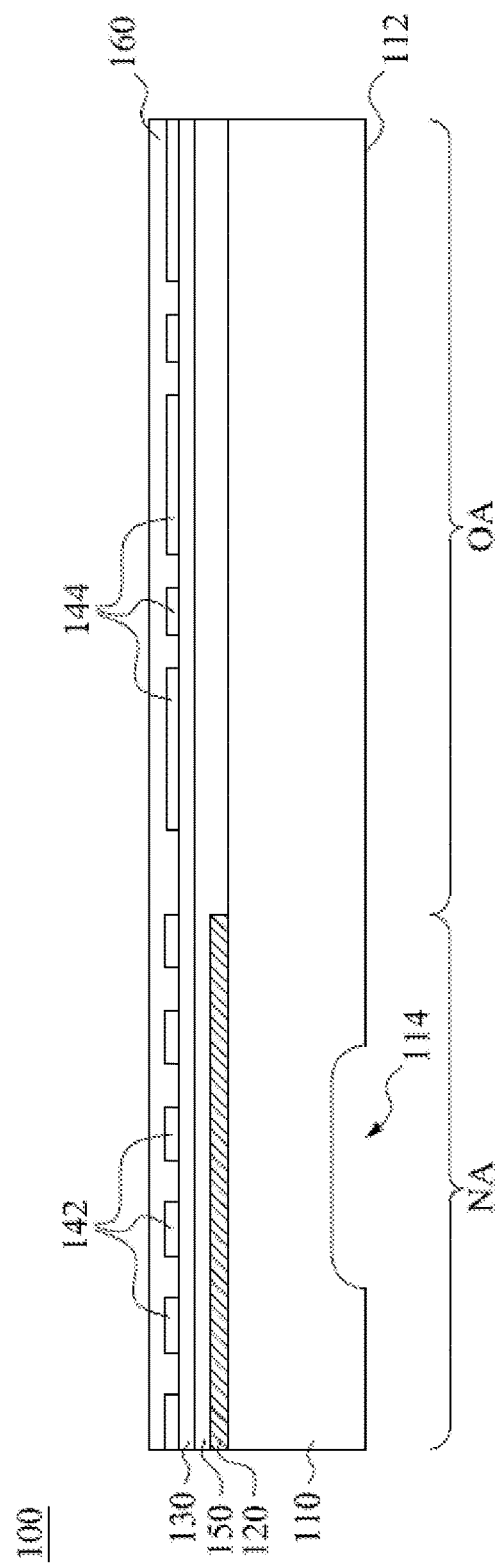
FIG.7C
FIG.7D

TOUCH PANEL WITH FINGERPRINT IDENTIFICATION FUNCTION AND METHOD FOR FABRICATING THE SAME

RELATED APPLICATIONS

This application claims priority to Chinese Application Serial Number 201510382111.8, filed in the People's Republic of China on Jul. 3, 2015, which is herein incorporated by reference.

BACKGROUND

Field of the Disclosure

The present disclosure relates to touch panels and methods for fabricating the same. More particularly, the present disclosure relates to touch panels with a fingerprint identification function and methods for fabricating the same.

Description of Related Art

Recently, fingerprint identification technologies have been widely utilized in various electronic devices. The fingerprint identification technologies provide good anti-theft functions and privacy protection for personal information in mobile devices, and therefore are becoming one of the main research thrusts in personal electronic devices.

In a fingerprint identification technology applied to electronic devices, fingerprints are detected by a fingerprint sensor chip module. However, with such design, the fingerprint sensor chip module may occupy too much space, and transducers in the fingerprint sensor chip are disposed far away from fingers which may result in poor sensitivity.

SUMMARY

For tackling the aforementioned poor sensitivity and space problems to overcome the disadvantages of the conventional technology, the present disclosure provides a touch panel with a fingerprint identification function. A fingerprint sensor array is disposed on a flexible substrate, and the distance between a user's fingers and a fingerprint sensing array is reduced, thereby increasing the sensitivity of fingerprint identification and resolving the problems of the fingerprint sensor chip module occupying too much space in the conventional technology.

Another aspect of the present disclosure provides a method for fabricating a touch panel with a fingerprint identification function. The fingerprint sensing array is initially thrilled on a flexible substrate and then bonded with a cover plate, such that the distance between the fingerprint sensing array and a user's fingers is reduced. The combination of the fingerprint sensing array and the flexible substrate may be fitted with various cover plates of different sizes, types, or structures, thereby realizing mass customization.

Still another aspect of the present disclosure provides a method for fabricating a touch panel with a fingerprint identification function. The fingerprint sensing array and the touch sensing array are both formed on the same flexible substrate, and thereby the number of fabrication steps and the fabrication cost are reduced.

One aspect of the present disclosure provides a touch panel with a fingerprint identification function, in which the touch panel includes a cover plate, a mask layer, a flexible substrate, and a fingerprint sensing array. The mask layer is disposed on the cover plate for defining an operating region and a non-operating region of the touch panel. The flexible substrate is disposed on the mask layer and at least in the non-operating region. The fingerprint sensing array is directly disposed on the flexible substrate in the non-operating region.

In one or more embodiments of the present disclosure, the flexible substrate is an adhesive gel, such that the flexible substrate is disposed on the mask layer directly.

In one or more embodiments of the present disclosure, a thickness of the flexible substrate is in a range from 5 micrometers to 35 micrometers.

In one or more embodiments of the present disclosure, the touch panel further includes a touch sensing array, wherein the flexible substrate is disposed in both the operating region and the non-operating region, and the touch sensing array is disposed on the flexible substrate in the operating region.

In one or more embodiments of the present disclosure, the fingerprint sensing array is formed on the flexible substrate initially and then is bonded with the cover plate.

In one or more embodiments of the present disclosure, the touch panel further includes an adhesive layer Which is configured to bond the flexible substrate with the cover plate.

In one or more embodiments of the present disclosure, the fingerprint sensing array is disposed at a side of the flexible substrate facing the cover plate or at a side of the flexible substrate opposite to the cover plate.

In one or more embodiments of the present disclosure, a portion of the cover plate corresponding to the fingerprint sensing array has a thickness smaller than a thickness of the cover plate in the operating region.

In one or more embodiments of the present disclosure, the cover plate includes a first recess formed in the non-operating region, in which the first recess and the fingerprint sensing array are disposed at two opposite sides of the cover plate, and a orthographic projection of the first recess on the cover plate overlaps with a orthographic projection of the fingerprint sensing array on the cover plate.

In one or more embodiments of the present disclosure, the cover plate includes a second recess formed in the non-operating region, in which the mask layer conforms to the second recess and at least one portion of the flexible substrate and the fingerprint sensing array are disposed in the second recess and conform to the second recess.

In one or more embodiments of the present disclosure, the fingerprint sensing may is formed from at least one patterned conductive layer.

In one or more embodiments of the present disclosure, the flexible substrate is a thin film with a thickness in a range from 1 micrometer to 15 micrometers.

Another aspect of the present disclosure provides a method for fabricating a touch panel with a fingerprint identification function. The method includes disposing, a mask layer on a cover plate for defining an operating region and a non-operating region of the touch panel; forming a conductive layer on a flexible substrate; patterning the conductive layer to form a fingerprint sensing array on the flexible substrate; and bonding the cover plate with the flexible substrate, in which the fingerprint sensing array is disposed in the non-operating region of the touch panel.

In one or more embodiments of the present disclosure, the flexible substrate is an adhesive gel, and the step of bonding the cover plate with the flexible substrate is performed by directly bonding the cover plate with the flexible substrate.

In one or more embodiments of the present disclosure, the flexible substrate is a thin film, and the step of bonding the cover plate with the flexible substrate is performed by attaching the flexible substrate to the cover plate through an adhesion layer.

In one or more embodiments of the present disclosure, the step of patterning the conductive layer includes forming a touch sensing array on the flexible substrate, in which the touch sensing array is disposed in the operating region after the cover plate is bonded with the flexible substrate.

In one or more embodiments of the present disclosure, the method further includes forming the flexible substrate on a plate before the conductive layer is formed on the flexible substrate; and separating the flexible substrate from the plate after the conductive layer is patterned.

In one or more embodiments of the present disclosure, the method further includes forming the flexible substrate on a plate before the conductive layer is formed on the flexible substrate; forming a protective layer on the fingerprint sensing array after the conductive layer is patterned; and separating the flexible substrate from the plate before the cover plate is bonded with the flexible substrate, wherein a side of the flexible substrate is bonded with the cover plate.

In one or more embodiments of the present disclosure, the method further includes forming a first recess on the cover plate in the non-operating region, wherein the first recess and the fingerprint sensing array are disposed at two opposite sides of the cover plate, and a orthographic projection of the first recess on the cover plate overlaps with a orthographic projection of the fingerprint sensing array on the cover plate.

In one or more embodiments of the present disclosure, the method further includes forming a second recess on the cover plate in the non-operating region, and the step of bonding the cover plate with the flexible substrate includes attaching the flexible substrate to the fingerprint sensing array in the second recess, in which the flexible substrate and the fingerprint sensing array conforms to the second recess.

BRIEF DESCRIPTION OF THE DRAWINGS

FIG. 3 is a cross-sectional view of a touch panel with a fingerprint identification function according to some embodiments of the present disclosure;

FIG. 4 is a cross-sectional view of a touch panel with a fingerprint identification function according to some embodiments of the present disclosure;

FIGS. 6A-6D are schematic views showing a method for fabricating a touch panel with a fingerprint identification function according to some embodiments of the present disclosure: and FIGS. 7A-7D are schematic views showing a method for fabricating a touch panel with a fingerprint identification function according to some embodiments of the present disclosure.

DETAILED DESCRIPTION

Figure 1:
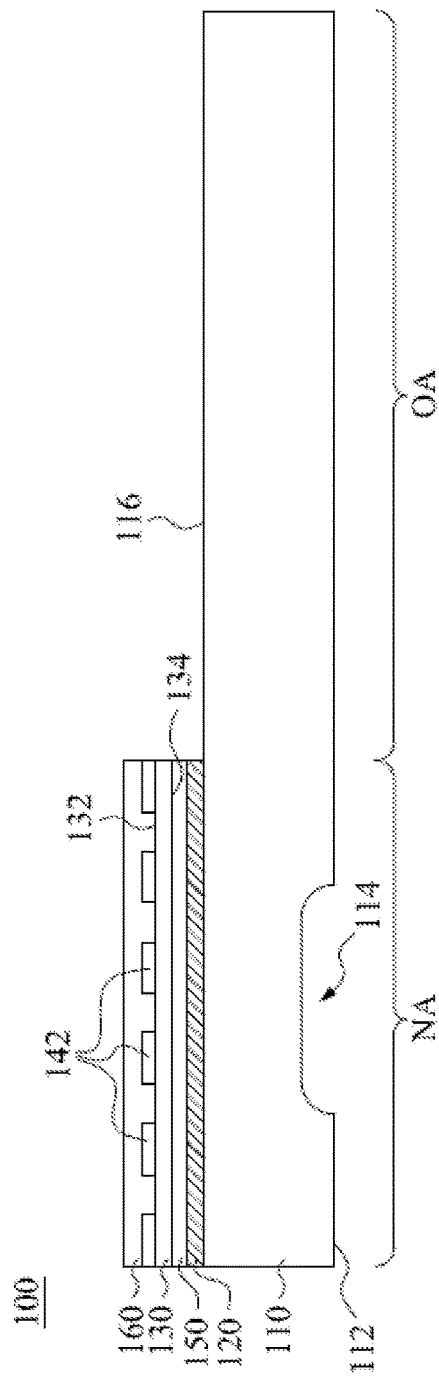
FIG. 1 is a cross-sectional view of a touch panel with a fingerprint identification function according to some embodiments of the present disclosure.

Reference will now be made in detail to the present embodiments of the disclosure examples of which are illustrated in the accompanying drawings. Wherever possible, the same reference numbers are used in the drawings and the description to refer to the same or like parts.

FIG. 1 is a cross-sectional view of a touch panel 100 with a fingerprint identification function according to some embodiments of the present disclosure. The touch panel 100 includes a cover plate 110, a mask layer 120, a flexible substrate 130, and a fingerprint sensing array 142. The mask layer 120 is disposed on the cover plate 110 for defining an operating region OA and a non-operating region NA of the touch panel 100. The flexible substrate 130 is disposed on the mask layer 120 and at least in the non-operating region NA. The fingerprint sensing array 142 is directly disposed on the flexible substrate 130 in the non-operating region NA. In some embodiments, the touch panel 100 further includes an adhesive layer 150 disposed between the flexible substrate 130 and the mask layer 120, and the adhesive layer 150 is configured to bond the flexible substrate 130 to the cover plate 110.

In one or more embodiments of the present disclosure, a transparent touch sensing array (not shown) is disposed in the operating region OA of the touch panel 100, and the fingerprint sensing array 142 and other circuit configurations connected to the touch sensing, array are disposed in the non-operating region NA of the touch panel 100.

In some embodiments, the fingerprint sensing, array 142 is initially formed on the flexible substrate 130, and then the fingerprint sensing array 142 and the flexible substrate 130 are bonded with the cover plate 110 in the non-operating region NA through the adhesive layer 150. Compared with an ordinary rigid glass substrate, the flexible substrate 130 has a small thickness and is bendable. Consequently, the combination of the fingerprint sensing array 142 and the flexible substrate 130 may be fitted with various cover plates of different sizes, types, or shapes, such as the cover plates having flat surfaces or tilted and curved surfaces, thereby realizing mass customization. When the fingerprint sensing array 142 is directly disposed on the flexible substrate 130, compared with the conventional design utilizing a fingerprint sensor chip module, the designs of this embodiment may reduce the distance between the fingerprint sensing array 142 and the surface 112 of the cover plate 110. In other words, the distance between a user's fingers and the fingerprint sensing array 142 is reduced, thereby enhancing the sensitivity of fingerprint identification.

In one or more embodiments of the present disclosure, the cover plate 110 is configured to hold plural components of the touch panel 100, and has certain rigidity. A material forming the cover plate 110 may be glass or plastic. The cover plate 110 generally has high transmittance, such that the touch panel 100 may be fitted with a display panel (not shown) to form a touch display device.

The mask layer 120 is disposed in the non-operating region NA for shielding the circuit configuration in the non-operating region NA. The mask layer 120 has low transmittance, and may be black ink, black photoresist, white ink, white photoresist, or stacked layers thereof. The mask layer 120 may be formed by various appropriate methods, such as coating or printing. Consequently, the non-operating region NA of the touch panel 100 is opaque, and the operating region OA is transparent, such that a user may not see the other circuit configuration in the non-operating region NA of the touch panel 100.

In one or more embodiments of the present disclosure, comparing with the cover plate 110, the flexible substrate 130 has better flexibility and a smaller thickness. The thickness of the flexible substrate is in a range from about 5 micrometers to about 35 micrometers. A material forming, the flexible substrate 130 may be polyvinyl chloride (PVC), polyimide (PI), polypropylene (PP), polystyrene (PS), acrylonitrile butadiene styrene (ABS), polyethylene terephthalate (PET), polycarbonate (PC), polyethylene (PE), or polymethylmethacrylate (PMMA). The flexible substrate 130 may be a thin film with a thickness in a range from about 1 micrometer to about 15 micrometers. To be specific, the flexible substrate 130 may have a thickness in a range from about 2 micrometers to about 5 micrometers. In addition to the effect of reducing the distance, since the flexible substrate 130 has a small thickness, the volume of fingerprint sensors can be reduced and prevented from occupying much space. The fingerprint sensors can be attached to a flat surface or a tilted and curved surface of a component.

In one or more embodiments of the present disclosure, the fingerprint sensing array 142 may be formed from at least one patterned conductive layer. In other words, the fingerprint sensing array 142 may be sensing electrodes of one single layer or sensing electrodes of two layers. Herein, the sensing electrodes of one single layer are used as an example of the fingerprint sensing array 142. For example, the patterned conductive layer may be formed on the flexible substrate 130 by fabrication processes such as deposition, lithography, and etching. The fingerprint sensing array 142 may be initially formed on the flexible substrate 130 and then bonded with the cover plate 110. Herein, the fingerprint sensing array 142 may be formed from a transparent conductive material, such as indium tin oxide (ITO), aluminum-doped zinc oxide (AZO), zinc oxide (ZnO), antimony tin oxide (ATO), tin oxide ($SnO_2$), indium oxide ($In_2O_3$), nano silver, nano copper, carbon nanotube or metal mesh. The fingerprint sensing array 142 may be formed from an opaque conductive material, such as copper, silver, or other metal materials.

In some embodiments, a protective layer 160 may be optionally formed on the fingerprint sensing array 142. The protective layer 160 is configured to protect the fingerprint sensing array 142 from scratches. In some embodiments, the protective layer 160 may be a removable thin film. A material forming the protective layer 160 may be polyethylene terephthalate (PET), photoresist, silicon oxide, and so on. A thickness of the protective layer 160 is in a range from about 2 micrometers to about 15 micrometers.

In one or more embodiments of the present disclosure, a portion of the cover plate 110 corresponding to the fingerprint sensing array 142 has a thickness smaller than a thickness of the cover plate 110 in the operating region OA. To be specific, the cover plate 110 includes a first recess 114 formed in the non-operating region NA. Through the configuration of the first recess 114, a distance between the surface 112 and the fingerprint sensing array 142 can be reduced, thereby increasing the sensitivity of fingerprint identification. In some embodiments, the first recess 114 and the fingerprint sensing array 142 are disposed at two opposite sides of the cover plate 110. That is, the first recess 114 is disposed adjoining, the surface 112 of the cover plate 110. An orthographic projection of the first recess 114 on the cover plate 110 overlaps with an orthographic projection of the fingerprint sensing array 142 on the cover plate 110. In some embodiments, the cover plate 110 may not need to have the first recess 114, and thus the configuration of the first recess 114 does not intend to limit the scope of the present disclosure.

In some embodiments, the fingerprint sensing array 142 is disposed at a side 132 of the flexible substrate 130 opposite to the cover plate 110. That is, the fingerprint sensing array 142 is not disposed at the side 134 of the flexible substrate 130 which touches the adhesive layer 150, and thus integrated circuit chips (not shown) can be electrically connected with the fingerprint sensing array 142 or subsequent circuits conveniently, but embodiments of the present disclosure are not limited thereto.

Figure 2:
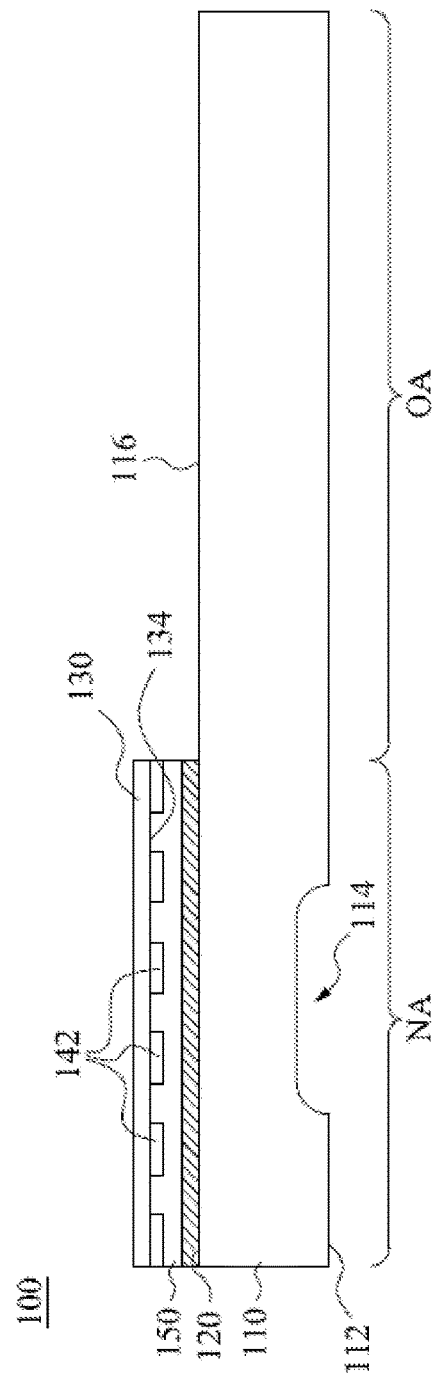
FIG. 2 is a cross-sectional view of a touch panel with a fingerprint identification function according to some embodiments of the present disclosure.

FIG. 2 is a cross-sectional view of a touch panel 100 with a fingerprint identification function according to some embodiments of the present disclosure. In some embodiments, the fingerprint sensing array 142 is disposed at a side 134 of the flexible substrate 130 facing the cover plate 110. Compared with the embodiments of FIG. 1, since the fingerprint sensing array 142 of the present embodiment is disposed at the side 134 of the flexible substrate 130 adjacent to the cover plate 110, the distance between the fingerprint sensing, array 142 and the surface 112 may be reduced, thereby increasing the sensitivity of fingerprint identification.

As illustrated previously, the fingerprint sensing array 142 is initially formed on the flexible substrate 130, and then the fingerprint sensing array 142 and the flexible substrate 130 are bonded with the cover plate 110 through the adhesive layer 150. In some embodiments, after the fingerprint sensing array 142 is formed on the flexible substrate 130, a protective layer 160 may be disposed on the fingerprint sensing array 142 for protecting the fingerprint sensing array 142 from scratches.

In some embodiments, when the flexible substrate 130 is desired to be bonded with the cover plate 110 through the adhesive layer 150, the protective layer 160 is removed, and the adhesive layer 150 may touch the fingerprint sensing array 142 directly. In some embodiments, a protective layer (not shown) is still disposed on the fingerprint sensing array 142, meaning that the protective layer (not shown) may be kept between the adhesive layer 150 and the fingerprint sensing array 142, such that the adhesive layer 150 does not contact the fingerprint sensing array 142 directly, FIG. 3 is a cross-sectional view of a touch panel 100 with a fingerprint identification function according to some embodiments of the present disclosure. There is no adhesive layer 130 (referring to FIG. 1) configured to bond the flexible substrate 130 with the cover plate 110 in some embodiments.

In one or more embodiments of the present disclosure, the flexible substrate 130 is a gel and is formed by applying the gel onto the mask layer 120, such that the flexible substrate 130 is directly formed on the mask layer 120. Herein, the gel may be an optical clear adhesive with high transmittance, a translucent adhesive, or an opaque adhesive. The gel may be adhered to the mask layer 120 in a conformal manner. Herein, a solidified optical clear adhesive is disposed as the flexible substrate 130, and the fingerprint sensing, array 142 is directly disposed on the flexible substrate 130 (e. g. the solidified optical clear adhesive), such that the distance between the fingerprint sensing array 142 and the surface 112 may be reduced by omitting additional layers. The sensitivity of fingerprint identification is increased.

FIG. 4 is a cross-sectional view of a touch panel 100 with a fingerprint identification function according to some embodiments of the present disclosure. In some embodiments, the touch panel further includes a second recess 118, and the fingerprint sensing array 142 is disposed in the second recess 118. The second recess 118 is disposed adjacent to the surface 116 of the cover plate 110, in which the surface 115 is opposite to the surface 112. In one or more embodiments of the present disclosure, portions of the mask layer 120, the flexible substrate 130, and the adhesive layer 150 may be disposed in the second recess 118. Integrated circuit chips (not shown) electrically connected to the fingerprint sensing array 142 may be disposed on the flexible substrate 130 outside the second recess 118. To be specific, the mask layer 120 may be formed by methods such as deposition, lithography, and etching, and attached to the second recess 118 in a conformal manner. A material of the adhesive layer 150 may be a solid gel or a liquid gel, and therefore the adhesive layer 150 may be formed on the mask layer 120 in the conformal manner. The flexible substrate 130 is flexible, and therefore at least one portion of the flexible substrate 130 and the fingerprint sensing array 142 may be disposed in the second recess 118, in which the flexible substrate 130 and the fingerprint sensing array 142 conform to the second recess.

Through the configuration of the first recess 114 and the second recess 118, the distance between the surface 112 and the fingerprint sensing array 142 may be reduced, thereby increasing the sensitivity of fingerprint identification. In addition, the first recess 114 is not a necessary component. In some embodiments, the first recess 114 may be omitted, while the second recess 118 is formed inside the touch panel 100, such that the second recess 118 does not affect or destroy the appearance of the touch panel 100. Therefore, the touch panel 100 is prevented from being damaged by stress concentration resulted from collisions, and the touch panel 100 may sustain the reliability thereof. On the other hand, compared with the process of directly forming the fingerprint sensing array 142 in the second recess 118, the process of initially forming the fingerprint sensing array 142 on the flexible substrate 130 and then attaching the fingerprint sensing array 142 and the flexible substrate 130 to the second recess 188 is more feasible and may promote fabrication yield and efficiency.

Figure 5:
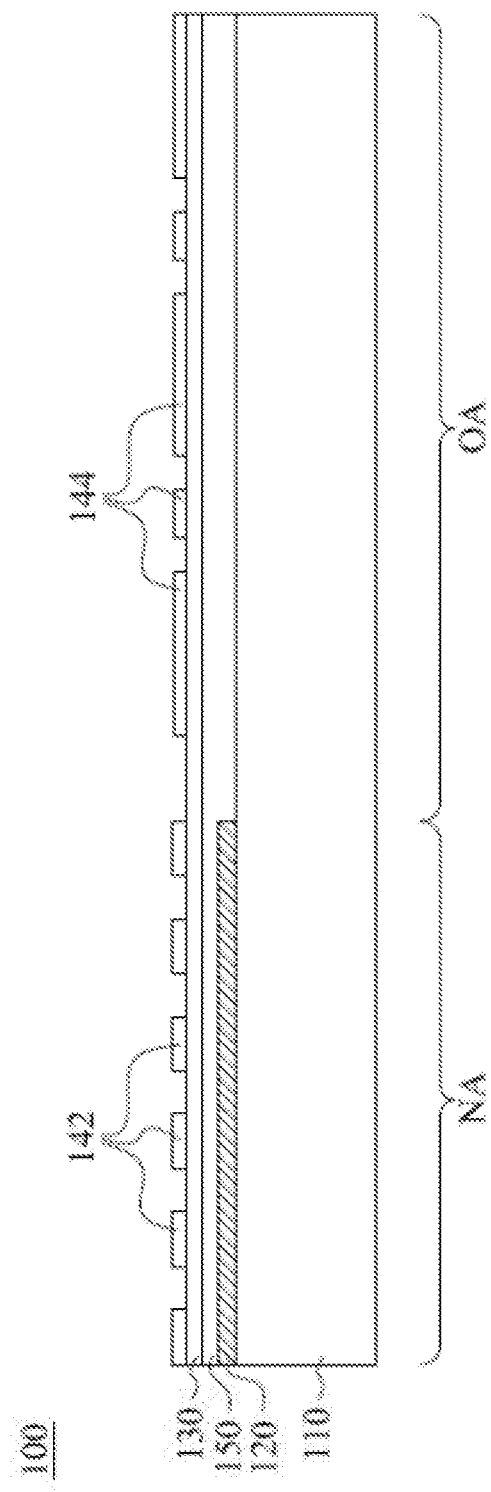
FIG. 5 is a cross-sectional view of a touch panel with a fingerprint identification function according to some embodiments of the present disclosure.

FIG. 5 is a cross-sectional view of a touch panel with a fingerprint identification function according to some embodiments of the present disclosure. The touch panel further includes a touch sensing array 114, disposed in the operating region OA. In some embodiments, the flexible substrate 130 is disposed in both the operating region OA and the non-operating region NA, and the touch sensing array 144 is disposed on the flexible substrate 130 in the operating region OA.

As illustrated previously, the touch sensing array 144 may be formed by a transparent conductive material. In some embodiments, the material of the fingerprint sensing array 142 may be the same as that of the touch sensing array 144. The fingerprint sensing array 142 and the touch sensing array 144 in the operating region OA may be formed on the same flexible substrate 130 through the same fabrication processes, and then the adhesive layer 150 bonds the flexible substrate 130 with the cover plate 110 to form the touch panel 100. In other words, the fingerprint sensing array 142 and the touch sensing array 144 may be formed from the same material through the same fabrication processes, but embodiments of the present disclosure are not limited thereto. In some embodiments, the fingerprint sensing array 142 and the touch sensing array 144 may be formed from different materials, and formed on the flexible substrate 130 through different fabrication processes respectively or through partially the same fabrication processes. Then, the adhesive layer 150 bonds the flexible substrate 130 with the cover plate 110 to form the touch panel 100.

Herein, the flexible substrate 130 in the non-operating region NA and the operating region OA is continuously connected or integrally formed, but embodiments of the present disclosure are not limited thereto. In some embodiments, the flexible substrate 130 where the fingerprint sensing array 142 and the touch sensing array 144 are arranged may be divided into a fingerprint sensing portion and a touch sensing portion which are attached to the cover plate 110 in the non-operating region NA and the operating region OA respectively. That is, the flexible substrate 130 in the non-operating region NA and the operating region OA may be disconnected.

In some embodiments, the touch panel 100 does not include the first recess 114 (referring to FIG. 1), and only the embodiment without the recess is provided herein, but embodiments of the present disclosure are not limited thereto. The touch panel 100 of the present embodiment may be configured with the first recess 114.

Through the configuration, the fingerprint sensing array 142 and the touch sensing array 144 may be initially formed on the flexible substrate 130. Since the fabrication steps of the fingerprint sensing array 142 and the touch sensing array 144 are similar, the fabrication steps may be combined and simplified, thereby reducing fabrication costs.

FIGS. 6A-6D are schematic views showing a method for fabricating a touch panel 100 with a fingerprint identification function according to some embodiments of the present disclosure. The present disclosure provides the method for fabricating the touch panel 100 with a fingerprint identification function, and the method includes the following steps.

At first, referring to FIG. 6A, a mask layer 120 is disposed on a cover plate 110 for defining an operating region OA and a non-operating region NA of the touch panel. Herein, it is optional to form a first recess 114 initially on the surface 112 of the cover plate 110 in the non-operating region NA. The mask layer 120 may be formed by coating black inks.

Figure 6C:
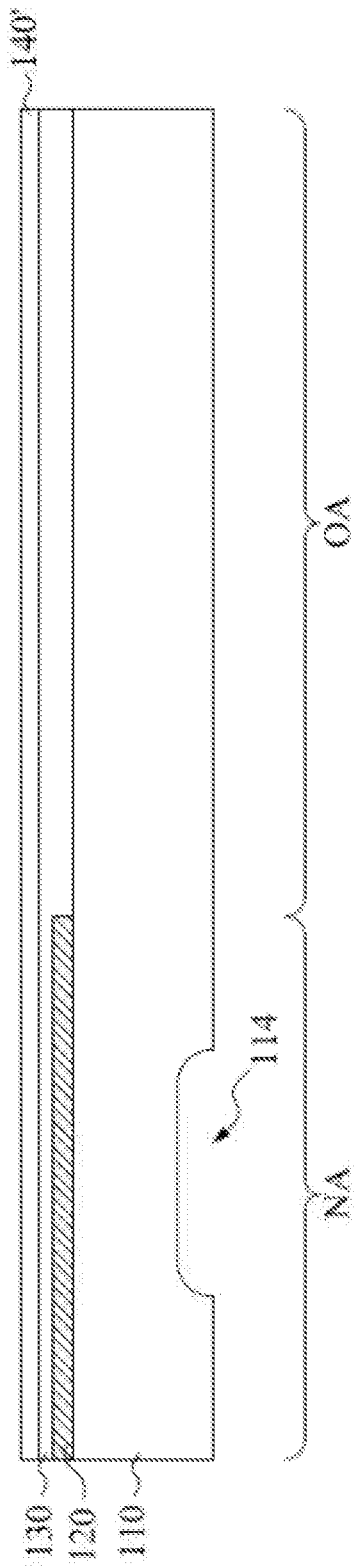

Next, referring to FIG. 6B, a gel 130' is formed on at least the mask layer 120 by a process such as coating, and the gel 130' is cured for forming the flexible substrate 130 (referring to FIG. 6C), in which the flexible substrate 130 is disposed at least in the non-operating region NA. In other words, the flexible substrate 130 is a gel 130', and the flexible substrate 130 is directly bonded with the cover plate 110 by coating the gel 130'. In some embodiments, the gel 130' may be coated on the mask layer 120 and portions of the cover plate 110 which are not covered by the mask layer 120, such that the flexible substrate 130 (referring FIG. 6C) is disposed in the non-operating region NA and the operating region OA. After the flexible substrate 130 is formed, additional protective layers (not shown) may be formed thereon and then removed in subsequent processes. For example, the additional protective layers may be removed after a conductive layer 140' is formed as shown in FIG. 6C.

Subsequently, referring to FIG. 6C, the conductive layer 140' is formed on the flexible substrate 130. A material forming the conductive layer 140' may be a transparent conductive material. The conductive layer 140' may be formed on the flexible substrate 130 by deposition or other methods.

Figure 6D:
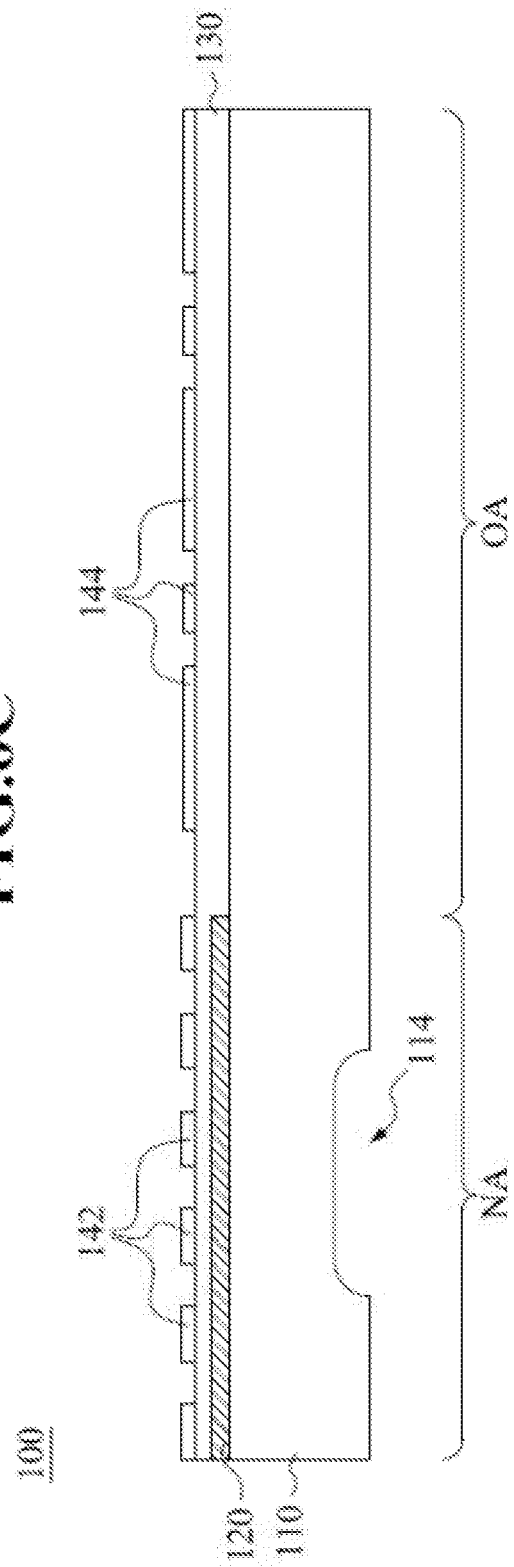

After that, referring, to FIG. 6D, the conductive layer 140' is patterned to form a fingerprint sensing army 142 on the flexible substrate 130 in the non-operating region NA and a touch sensing array 144 on the flexible substrate 130 in the operating region OA. The fingerprint sensing array 142 is configured to detect a user's fingerprint, while the touch sensing array 144 is configured to detect touch positions of the user's fingers. The electrode configurations of the fingerprint sensing array 142 and the touch sensing array 144 may be different. Herein, the first recess 114 and the fingerprint sensing array 142 are disposed at two opposite sides of the cover plate 110, and an orthographic projection of the first recess 114 on the cover plate 110 overlaps with an orthographic projection of the fingerprint sensing array 142 on the cover plate 110.

Thereafter, an integrated circuit chip (not shown) configured to process fingerprint sensing information is attached to the flexible substrate 130, and is electrically connected to the fingerprint sensing array 142. Since the integrated circuit chip (not shown) is directly bonded with the fingerprint sensing array 142, the signal transmitting path can be reduced, and the inspection precision of the fingerprint sensing array can be enhanced. Through the configuration, the touch panel 100 can inspect the user's fingerprint by the fingerprint sensing array 142 disposed on the flexible substrate 130, thus achieving the purpose of fingerprint identification.

Various techniques may be included in the above fabrication process. For example, integrated circuit chips for processing touch-sensing information may be bonded and electrically connected to the touch sensing array 144. The steps illustrated above do not intend to limit the scope of the present disclosure.

FIGS. 7A-7D are schematic views showing a method for fabricating a touch panel with a fingerprint identification function according to some embodiments of the present disclosure. The present disclosure provides the method for fabricating the touch panel 100 with a fingerprint identification function, and the method includes the following steps.

Figure 7A:
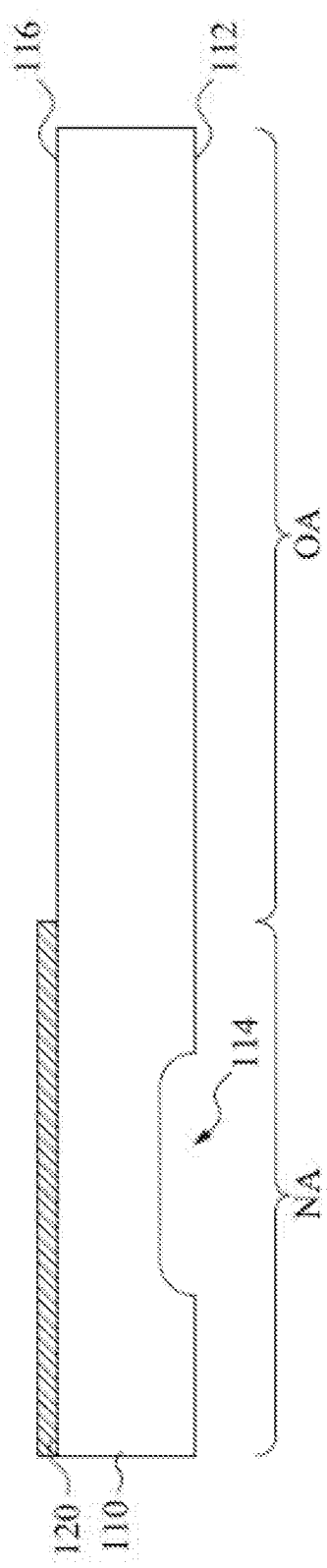

At first, referring to FIG. 7A, a mask layer 120 is disposed on the cover plate 110 for defining the non-operating region NA and the operating region OA. In some embodiments, a first recess 114 may be optionally formed on the surface 112 of the cover plate 110 in the non-operating region NA, or a second recess (not shown) may be optionally formed on the surface 116 in the non-operating region NA The mask layer 120 may be formed by coating black inks.

Figure 7B:
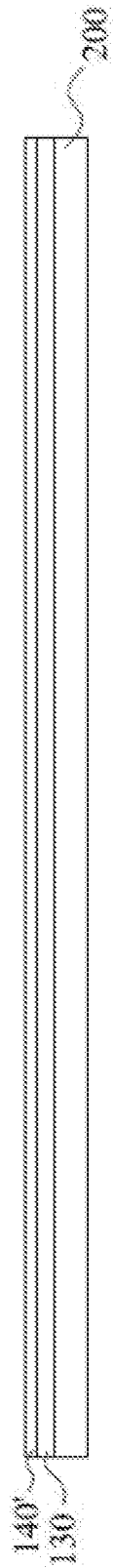

Next, referring to FIG. 7B, a conductive layer 140' is formed on the flexible substrate 130. In some embodiments, since the flexible substrate 130 is thin and flexible, the flexible substrate 130 may be formed on a plate 200 or other protection films before the conductive layer 140' is formed on the flexible substrate 130. The plate 200 is capable of supporting the flexible substrate 130 in the subsequent fabrication process, but does not constitute the finished touch panel. Though not shown in figures, in another embodiment, the flexible substrate 130 may be formed from an optical clear adhesive with protection films (not shown) disposed on upper and lower surfaces of the optical clear adhesive. Before the conductive layer 140' is formed, one of the protection films may be removed, and then the conductive layer 140' is disposed on the surface of the optical clear adhesive (the flexible substrate 130). As illustrated previously, a material of the conductive layer 140' may be one of transparent conductive materials. A material of the flexible substrate 130 may be polyvinyl chloride (PVC), polyimide (PI), polypropylene (PP), polystyrene (PS), acrylonitrile butadiene styrene (ABS), polyethylene terephthalate (PET), polycarbonate (PC), polyethylene (PE), or polymethylmethacrylate (PMMA). The conductive layer 140 may be formed on the flexible substrate 130 by deposition or other methods.

Subsequently, referring to FIG. 7C, the conductive layer 140' is patterned to form a fingerprint sensing array 142 and a touch sensing array 144 on the flexible substrate 130. The fingerprint sensing array 142 and the touch sensing array 144 respectively correspond to the non-operating region NA (referring to FIG. 7A) and the operating region OA (referring to FIG. 7A) of the touch panel. In some embodiments, the fingerprint sensing array 142 and the touch sensing array 144 may be formed by the same fabrication processes for simplifying the fabrication processes, but embodiments of the present disclosure are not limited thereto. The fingerprint sensing array 142 and the touch sensing array 144 may be formed through different fabrication processes.

In some embodiments, after the patterning of the conductive layer 140', a protective layer 160 is formed on the fingerprint sensing array 142. Furthermore, before the cover plate 110 is bonded with the flexible substrate 130, the flexible substrate 130 is separated from the plate 200 or other protection films. In some embodiments, the protective layer 160 is removed, and a side of the flexible substrate 130 is to be bonded with the cover plate 110.

Thereafter, referring to FIG. 7D, the flexible substrate 130 and the cover plate 110 are bonded by adhesive layer 150, in which a side of the flexible substrate 130 is bonded with the cover plate 110. After the flexible substrate 130 and the cover plate 110 (referring to FIG. 7A) are bonded, the fingerprint sensing array 142 is disposed in the non-operating region NA (referring to FIG. 7A), and the touch sensing array 144 is disposed in the operating region OA (referring to FIG. 7A). Herein, the first recess 114 and the fingerprint sensing array 142 are disposed at two opposite sides of the cover plate 110, and an orthographic projection of the first recess 114 on the cover plate 110 overlaps with an orthographic projection of the fingerprint sensing array 142 on the cover plate 110.

In one or more embodiments, if the cover plate 110 includes the second recess (not shown), when the flexible substrate 130 and the cover plate 110 are bonded, the flexible substrate 130 and the fingerprint sensing array 142 are disposed in the second recess (not shown) and conform to the second recess (not shown). Thereafter, integrated circuit chips (not shown) configured to process fingerprint sensing information are attached to the flexible substrate 130, and are electrically connected to the fingerprint sensing array 142. Through the configuration, the touch panel 100 can inspect the fingerprint of users by the fingerprint sensing array 142 disposed on the flexible substrate 130, thus achieving the purpose of fingerprint identification.

Various techniques may be included in the above fabrication process. For example, integrated circuit chips for processing touch-sensing information may be bonded and electrically connected to the touch sensing array 144. The steps illustrated above are not intended to limit the scope of the present disclosure.

In various embodiments of the present disclosure, a fingerprint sensing array is disposed on a flexible substrate. Since the flexible substrate is thin and flexible, the flexible substrate adheres and conforms to the cover plate, thereby reducing the distance between the fingerprint sensing array and the finger. In addition, in various embodiments of the present disclosure, integrated circuit chips and the fingerprint sensing array are disposed separately, thereby resolving the problems that the conventional fingerprint sensor chips occupies too much space.

Although the present disclosure has been described in considerable detail with reference to certain embodiments thereof other embodiments are possible Therefore, the spirit and scope of the appended claims should not be limited to the description of the embodiments contained herein.

What is claimed is:

1. A touch panel with a fingerprint identification function, comprising:
    a cover plate;
    a mask layer disposed on the cover plate for defining an operating region and a non-operating region of the touch panel;
    a flexible substrate disposed on the mask layer and at least in the non-operating region;
    an adhesive layer configured to bond the flexible substrate with the cover plate, wherein:

the flexible substrate is disposed on a diametrically opposite side of the adhesive layer relative to the cover plate, and the adhesive layer directly contacts the flexible substrate and the mask layer;

a fingerprint sensing array disposed on a diametrically opposite side of the flexible substrate relative to the cover plate and directly contacting the flexible substrate in the non-operating region; and a protective layer disposed on a diametrically opposite side of the flexible substrate relative to the cover plate and directly contacting the flexible substrate, wherein:

the protective layer covers the fingerprint sensing array, and the fingerprint sensing array is disposed on a diametrically opposite side of the flexible substrate relative to the mask layer.

2. The touch panel of claim 1, wherein a thickness of the flexible substrate is in a range from 5 micrometers to 35 micrometers.

3. The touch panel of claim 1, further comprising:
a touch sensing array, wherein:
the flexible substrate is disposed both in the operating region and the non-operating region, and
the touch sensing array is disposed on the flexible substrate in the operating region.

4. The touch panel of claim 1, wherein the flexible substrate is a thin film having a thickness in a range from 1 micrometer to 15 micrometers.

5. The touch panel of claim 1, wherein:
a first portion of the cover plate corresponding to the fingerprint sensing array has a first thickness,
a second portion of the cover plate in the operating region has a second thickness, and
the first thickness is smaller than the second thickness.

6. The touch panel of claim 5, wherein:
the cover plate comprises a first recess disposed in the non-operating region,
the first recess is disposed on a diametrically opposite side of the cover plate relative to the fingerprint sensing array, and
an orthographic projection of the first recess on the cover plate overlaps with an orthographic projection of the fingerprint sensing array on the cover plate.

7. The touch panel of claim 6, wherein:
the cover plate comprises a second recess disposed on a diametrically opposite side of the cover plate relative to the first recess in the non-operating region,
the mask layer conforms to the second recess, and
at least one portion of the flexible substrate and the fingerprint sensing array are disposed in the second recess and conform to the second recess.

8. The touch panel of claim 1, wherein the fingerprint sensing array is formed from at least one patterned conductive layer.

9. The touch panel of claim 1, wherein the protective layer directly contacts the fingerprint sensing array.

10. A method for fabricating a touch panel with a fingerprint identification function, the method comprising:
disposing a mask layer on a cover plate for defining an operating region and a non-operating region of the touch panel;
forming a conductive layer on a flexible substrate;
patterning the conductive layer to form a fingerprint sensing array on the flexible substrate;
forming a protective layer directly on the flexible substrate to cover the fingerprint sensing array; and
bonding the flexible substrate with the cover plate, wherein, after bonding the flexible substrate with the cover plate:
the fingerprint sensing array is disposed on a diametrically opposite side of the flexible substrate relative to the mask layer in the non-operating region of the touch panel,
the fingerprint sensing array is disposed on a diametrically opposite side of the flexible substrate relative to the cover plate, and
the protective layer is disposed on a diametrically opposite side of the flexible substrate relative to the cover plate.

11. The method of claim 10, wherein:
the flexible substrate is a thin film, and
bonding the flexible substrate with the cover plate is performed by attaching an adhesion layer between the mask layer and the flexible substrate.

12. The method of claim 10, wherein patterning the conductive layer comprises:
forming a touch sensing array on the flexible substrate, wherein the touch sensing array is disposed in the operating region after the cover plate is bonded with the flexible substrate.

13. The method of claim 10, further comprising:
forming the flexible substrate on a plate before the conductive layer is formed on the flexible substrate; and
separating the flexible substrate from the plate after the conductive layer is patterned.

14. The method of claim 10, further comprising:
forming the flexible substrate on a plate before the conductive layer is formed on the flexible substrate;
forming a protective layer on the fingerprint sensing array after the conductive layer is patterned; and
separating the flexible substrate from the plate before the cover plate is bonded with the flexible substrate, wherein bonding the flexible substrate with the cover plate is performed by bonding a side of the flexible substrate with the cover plate.

15. The method of claim 10, further comprising:
forming a first recess on the cover plate in the non-operating region, wherein:
the first recess is disposed on a diametrically opposite side of the cover plate relative to the fingerprint sensing array, and
a orthographic projection of the first recess on the cover plate overlaps with a projection of the fingerprint sensing array on the cover plate.

16. The method of claim 15, further comprising:
forming a second recess on a diametrically opposite side of the cover plate relative to the first recess in the non-operating region, wherein bonding the flexible substrate with the cover plate comprises:
attaching the flexible substrate and the fingerprint sensing array in the second recess,
wherein the flexible substrate and the fingerprint sensing array conform to the second recess.

17. A touch panel with a fingerprint identification function, comprising:
a cover plate;
a mask layer disposed on the cover plate for defining an operating region and a non-operating region of the touch panel;
a flexible substrate disposed on a diametrically opposite side of the mask layer relative to the cover plate at least in the non-operating region;

a fingerprint sensing array disposed on a side of the flexible substrate facing to the cover plate and directly contacting the flexible substrate; and an adhesive layer, wherein:
  the adhesive layer is disposed on a diametrically opposite side of the flexible substrate relative to the mask layer, and
  the adhesive layer directly contacts the flexible substrate, the fingerprint sensing array and the mask layer.

18. The touch panel of claim 17, wherein:
the cover plate comprises a first recess disposed in the non-operating region,
the first recess is disposed on a diametrically opposite side of the cover plate relative to the fingerprint sensing array, and
an orthographic projection of the first recess on the cover plate overlaps with an orthographic projection of the fingerprint sensing array on the cover plate.

19. The touch panel of claim 17, wherein:
a first portion of the cover plate has a first thickness,
a second portion of the cover plate has a second thickness, and
the first thickness is smaller than the second thickness.

20. The touch panel of claim 19, wherein:
the first portion vertically overlaps the fingerprint sensing array.

* * * * *